United States Patent [19]
Wilcox

[11] Patent Number: 4,599,500
[45] Date of Patent: Jul. 8, 1986

[54] TILT STEERING COLUMN HEAD MOUNTED SWITCH OPERATING CONTROL

[75] Inventor: Harry E. Wilcox, Plymouth, Mich.

[73] Assignee: Chrysler Corporation, Highland Park, Mich.

[21] Appl. No.: 718,780

[22] Filed: Apr. 1, 1985

[51] Int. Cl.[4] .......................... H01H 3/16; H01H 9/00
[52] U.S. Cl. ............................. 200/61.54; 200/61.27
[58] Field of Search ...................... 74/493, 552, 555; 200/61.27, 61.54, 4

[56] References Cited

U.S. PATENT DOCUMENTS

| | | | |
|---|---|---|---|
| 2,863,013 | 12/1958 | Brown et al. | 200/61.54 X |
| 3,881,076 | 4/1975 | Latka et al. | 200/61.54 |
| 4,006,328 | 2/1977 | Kimberlin et al. | 200/61.54 |
| 4,088,858 | 5/1978 | Kramer | 200/61.27 |
| 4,219,706 | 8/1980 | Kuch et al. | 200/61.54 X |
| 4,219,709 | 8/1980 | Scarbro | 200/61.54 |
| 4,328,431 | 5/1982 | Usami | 200/61.54 X |

*Primary Examiner*—J. R. Scott
*Attorney, Agent, or Firm*—Edward P. Barthel

[57] ABSTRACT

A steering column has a tilt head pivotal about a tilt axis. A switch is mounted on the column controlled by an actuator assembly having an actuator rod secured to the column for reciprocal movement along its axis. The actuator assembly includes a cam member connected to the column for pivotal movement about a cam axis disposed in an orthogonal offset manner to the rod axis. The cam member is engaged by the rod and is operated by a lever pivotal on the column about a lever axis parallel to the cam axis and which axis intersects the tilt axis at a right angle. The cam member has a compound-curved camming surface disposed in contact with a transverse cam finger portion extending from the lever. The arrangement permits the tilt head to be pivotally adjusted while allowing the actuator assembly to provide on/off control of the column switch.

1 Claim, 8 Drawing Figures

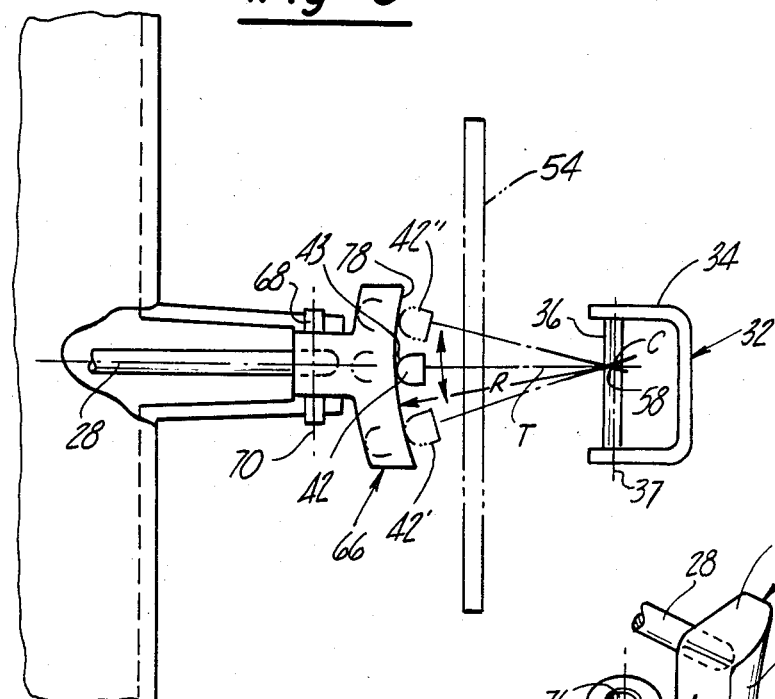
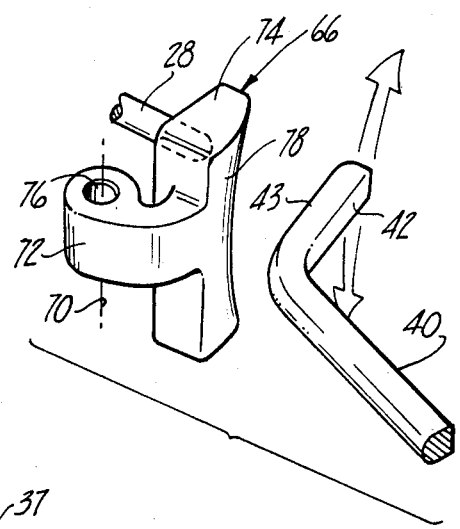
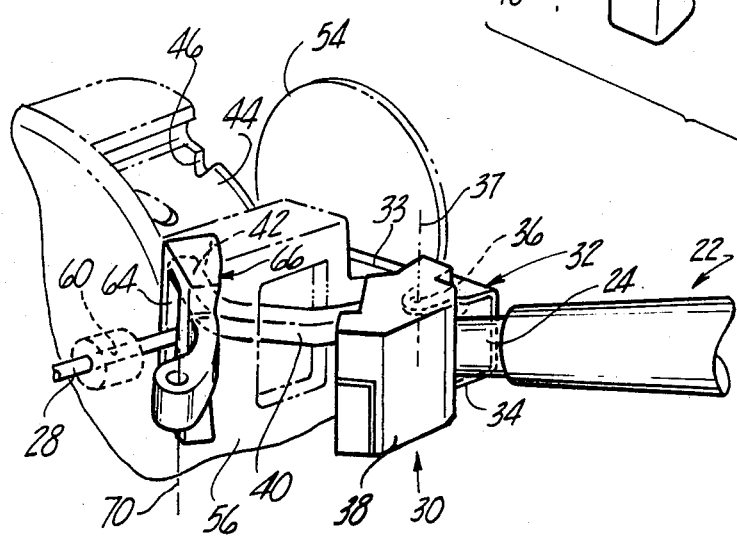

TILT STEERING COLUMN HEAD MOUNTED SWITCH OPERATING CONTROL

BACKGROUND OF THE INVENTION

This invention relates to vehicle steering column mounted control stalks, and, more particularly, to a new and improved turn signal and headlamp dimmer switch control mechanism housed in the lower support of an adjustable tilt head steering column and actuated by a single manual control stalk or lever.

The form of control stalk switch operating control illustrated herein forms the subject matter of U.S. Pat. No. 4,219,706 to Koch et al and 4,219,709 to Scarbro both issued Aug. 26, 1984, and of common ownership herewith. The control stalk of the present invention is especially suited for use in automobile vehicle headlamp dimmer and turn signal switch mechanisms adapted for tilthead steering columns. The control stalk motion translating assemblies for turn signals and headlamp dimmer switches shown in the above-mentioned patents require extensive modification for use in a tilt steering column. The U.S. Pat. No. 4,088,858 to Kramer, issued May 9, 1978, is an example of an existing turn signal and headlamp dimmer switch motion translating assembly used with one type of tilt steering column.

SUMMARY OF THE INVENTION

As opposed to the prior art mechanisms, the present invention provides an improved single lever switch-actuating mechanism which is readily incorporated in a tiltable head steering column for operating both the vehicle turn signal and headlamp dimmer switches. This invention uniquely modifies the existing control stalk switch arrangement of the Koch et al. and Scarbro patents by providing a dimmer switch pivoting cam actuator formed with a compound curved or saddle-back shaped camming surface. The cam actuator, in cooperation with a cam operating finger arrangement, enables both the turn signal and dimmer switches to be actuated in any tilt position of the steering wheel adjustable head. Also, the dimmer switch can be operated with the turn signal switch in either the left or right turn signal position.

In this invention, the compound curved or saddle-back shaped cam actuator surface has the center of curvature of its concave portion coincident with the tilt head transverse tilt axis. Further, the tilt head axis intersects the pivotal axis of the control lever such that they are genthroughout the tilting movement of the steering wheelhead.

The above and other objects, advantages and features of the invention will appear more fully from consideration of the following detailed description made with reference to the accompanying drawings.

DESCRIPTION OF THE DRAWINGS

FIG. 3 is a fragmentary side elevational view taken substantially on line 3—3 of FIG. 2, with parts broken away and parts omitted for clarity showing the actuator cam arrangement of the invention;

FIG. 4 is a fragmentary perspective view, with part omitted, showing the switch actuating mechanism of the invention;

FIG. 5 is an enlarged, exploded perspective detail view of the actuator cam and finger of the invention;

DETAILED DESCRIPTION OF THE INVENTION

Figure 1:
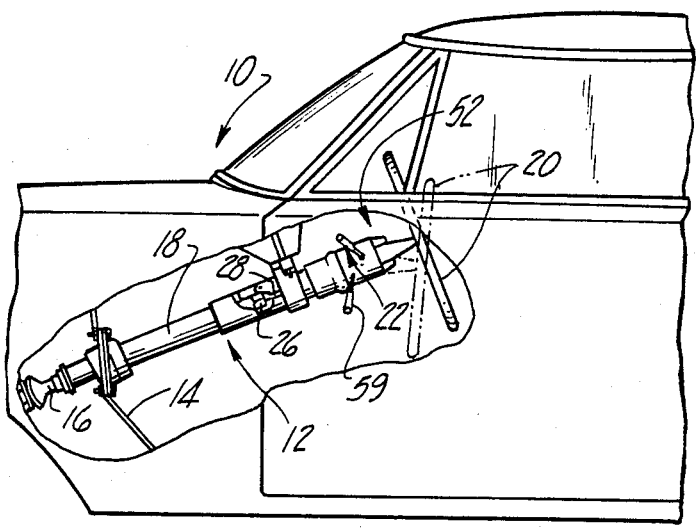
FIG. 1 is a fragmentary side elevational view of a portion of a conventional vehicle, parts being broken away to show the general location and range of movements of a steering column assembly in accordance with the invention.

With reference to the drawings, FIG. 1 illustrates a vehicle body 10 which has within its passenger compartment a steering column assembly 12 which projects forwardly through fire wall 14 into connection with the vehicle steering gear in the engine compartment. A rotatable lower steering shaft 16 is enclosed in a stationary cylindrical column 18, and mounting a tiltable steering wheel 20 at the upper end thereof. Extending from one side of and in a direction transverse to the longitudinal axis of the column is a control stalk assembly 22 surrounding a central control lever 24. The lever 24 is the swingably mounted actuator for a vehicle turn signal control switch or first switch assembly shown in phantom lines at 25. For a complete description of the control stalk assembly 22 reference should be had to the above-mentioned U.S. Pat. Nos. 4,219,706 and 4,219,709. The disclosures of these patents are incorporated by reference herein.

The control lever 24 is also swingably mounted in a second plane, which is mutually orthogonally related to the turn signal actuation plane. This second plane includes or is parallel to the longitudinal axis of the column 18, for actuation of a S.P.D.T headlight HI-LO beam selector or dimmer second switch assembly shown at 26 in FIG. 1. The dimmer switch 26 is fixably mounted along the exterior of the column 18 and provides for manual HI-LO beam selection and/or cyclical interrupting HI-beam signalling. The dimmer switch has a compression coil spring 27 which biases a longitudinal control rod 28 shown in FIG. 1, in an upward direction away from the switch 26.

The lever 24 is suitably affixed to a longitudinally immovable portion of a motion translating assembly 30. The assembly 30 enables the swingable movements of the operation of the control stalk assembly 22 to be separately translated, coupled or transferred to selectively actuate the headlamp dimmer switch 26 and the vehicle turn signal switch 25.

Figure 2:
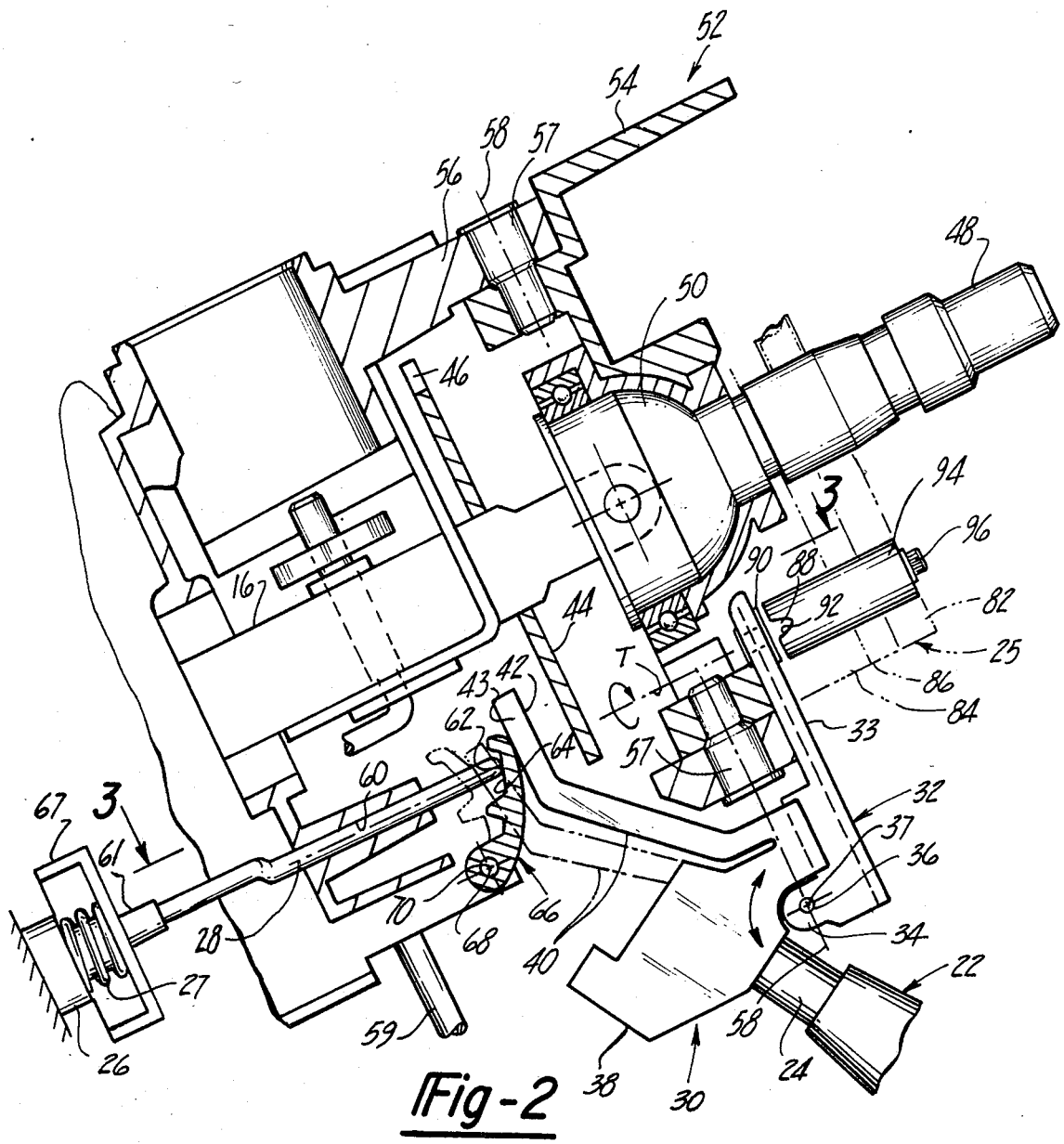
FIG. 2 is a fragmentary top elevational view, partly in section, of the steering column of FIG. 1.

As shown in FIG. 2, the motion translating assembly 30 comprises a first member 32 having a tongue member 33 extending toward the steering column from an inverted, U-shaped clevis portion 34. The clevis portion 34 is pivotally mounted at first pivot pin 36, with its normal pivot axis 37 shown in FIG. 3, to a second member in the form of a yoke-shaped block or switch housing 38. The switch housing 38 is integrally formed with an obliquely extending arm portion 40 terminating in a transversely oriented switch actuating finger 42. As seen in FIGS. 3 and 5 the finger 42 is formed with a half-round camming surface portion 43 in longitudinal cross section.

FIG. 1 shows the finger 42 oriented parallel with column lock plate 44 mounted on the upper end of the lower shaft 16. The lock plate has suitable openings 46 (FIG. 4) on its peripheral edge to receive a locking bolt (not shown). The steering wheel 20 is connected to an upper steering shaft 48 so that the driver can turn the steering wheel for vehicle steering purposes. The upper shaft 48 is pivotally connected by a universal joint 50 to the lower steering shaft 16 which extends axially within the column 18 into operative connection with vehicle steering gear (not shown) in the engine compartment of the vehicle 10.

A tilt head assembly 52 of the steering column has an internal tilt head casing 54 which is pivotally mounted to column lower stationary tilt head casing support cylinder 56 for limited tilting movement in a vertical plane, as indicated by wheel 20 in FIG. 1 of the drawing. The tilting movement is achieved by trunnion-like pivots 57 laterally aligned with the universal joint 50 on a common transverse tilt axis 58. As seen in FIG. 2, the tilt axis 58 is oriented to intersect cam pivot axis 37 of pivot pin 36 at a right angle juncture. Thus, the cam pivot axis 37 and the tilt axis 58 are generally orthogonal axis. A suitable column adjustable tilt locking mechanism (not shown) is operated by a tilt position handle 59 allowing the driver to raise or lower the tilt head assembly 52 and the steering wheel to a plurality of tilt positions. An example of a typical tilt locking mechanism which could be used in the present tilt column structure as shown in U.S. Pat. No. 3,167,971 issued Feb. 2, 1965 to Zeigler et al, the disclosure of which is incorporated by reference herein.

Figure 6:
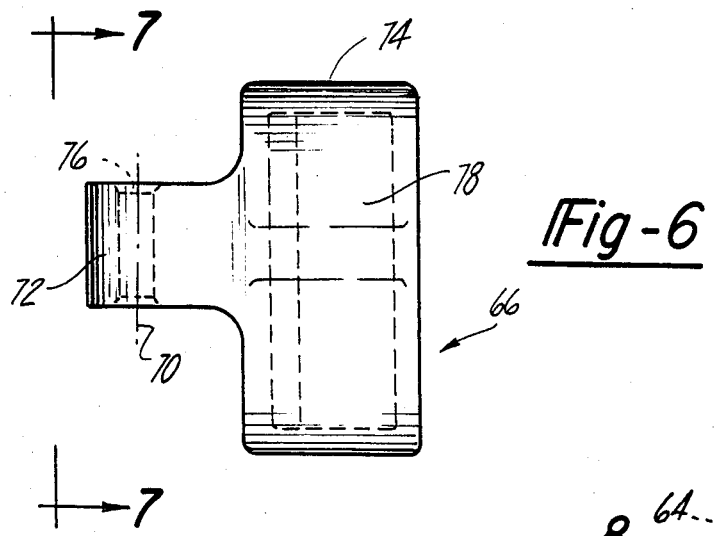
FIG. 6 is an enlarged detail plan view of the cam actuator.

As seen in FIG. 2, the control rod 28 extends longitudinally upward through a bore 60 of the column lower support cylinder 56. The rod has a first lower end 61 engaging dimmer switch 26 and a rounded free second upper end 62 which is biased axially upwardly by the coil spring means 27 associated with the HI-LO beam switch 26. The end 62 is thus maintained in a trapped manner within an elongated pocket 64 formed in a HI-LO beam switch actuating cam member, generally indicated at 66. The lower end 61 of the rod 28 engages an upwardly spring biased plunger or actuator 67 of the HI-LO beam dimmer switch 26 as described in detail in the above-mentioned U.S. Pat. ck portion 72. The neck portion 72 extends outwardly from one side of the cam member's shoulder portion 74 and has a rectangular shape when viewed in plan (FIG. 6). The neck portion free end has a hole 76 for receiving the second pivot pin 68 therethrough.

Figure 7:
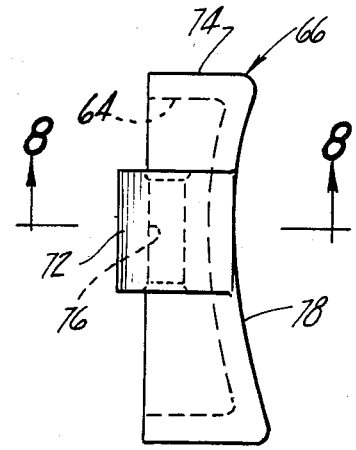
FIG. 7 is a side elevational view of the cam actuator.
Figure 8:
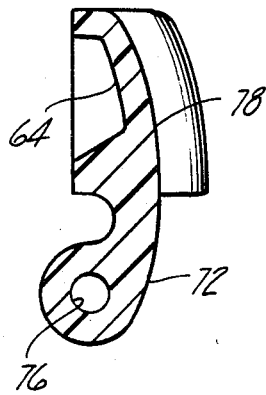
FIG. 8 is a sectional view taken on line 8—8 of FIG. 7.

FIGS. 5, 7 and 8 illustrate the shoulder portion 74 having its surface facing toward the operator formed with a compound-curved or saddle-shaped cam surface 78. Thus, the cam surface 78 has a convex curved profile when viewed in the horizontal sectional view of FIG. 8 and a concave curved profile when viewed in the vertical end view of FIG. 7. As best seen in FIGS. 5 and 6, the actuating finger 42 has its forwardly facing camming surface 43 formed with a half-round configuration when viewed in FIG. 3, in cross-section. It will be noted that the finger extends transversely to the lower steering shaft axis and parallel to the tilt axis 58.

It will be seen that longitudinally swingable movement of the control stalk 22 in a first direction upwardly or toward the operator and in a second direction downwardly or away from the operator moves the entire block housing 38, except the tongue member 33, about the first pivot pin 36. The downwardly pivoting block housing also moves its finger 42 downwardly causing a linear element of its half-round surface 43 to wipe along a convex element of the saddle-shaped cam surface 78. The downward wiping action swings the switch actuating cam member 66 about second pivot pin 68 in a downward direction causing the control rod 28 to depress the HI-LO beam switch spring 27. Release of the control lever 24 causes the bias spring 27 to return the rod 28 to its upward spring biased position. Each longitudinal up and down reciprocal cycle of the rod 28 actuates the HI-LO beam switch 26 either on or off.

As seen in FIG. 2 the vehicle turn signal control switch assembly, indicated in dashed lines at 25, includes a movable contact portion 82, a stationary bearing plate 84 and a stationary contact carrying portion 86. As shown and described in the mentioned U.S. Pat. No. 4,219,709, the turn signal control switch assembly 25 is mounted below and coaxially of the steering wheel 20 and on the stationary bearing plate 84 attached to the upper end of the column. Actuation of the turn signal switch from the control stalk 22 pivots the assembly 30 about turn signal pivot axis, shown generally by longitudinally dashed line T, which extends normal to and passes through the end of the tongue 33 opposite the first pivot pin 36. The end of the tongue 33 has a V-shaped notched nib 88 formed thereon below which is a threaded nut 90. Nib 88 is located on the aforesaid pivotal axis T and is received within a complementary V-shaped slotted end portion 92 of a cylindrical drive transmitting post 94. The upper end of the post 94 is molded in or otherwise suitable affixed to the movable switch conductor portion 82 of the turn signal switch 25. The lower end of the post 94 passes freely through the stationary bearing plate 84 upon the oscillation rocking movement of the post which is secured to the internally threaded nut 90 by a threaded screw 96.

As stated in the U.S. Pat. No. 4,219,709 the pivot axis T of the turn signal switch is aligned with the longitudinal axis of rod 28. Thus, oscillation of the yoke motion translating assembly 30 by the control stalk 22 about the axis T will not reciprocate the rod 28. This is true because the finger half-round surface 43 pivots against saddle-shaped surface 78 adjacent its medial symmetrical plane which plane includes the turn signal pivot axis T shown in FIG. 3.

Upon the steering wheel being tilted upwardly, the finger 42 is rotated to its dashed line position indicated at 42' in FIG. 3. Because of applicant's novel switch actuator arrangement the finger half-round surface 43 maintains line contact with the saddle-shaped cam surface 78. Thus, upon the assembly 30 being pivoted about axis T by the stalk, the half-round surface 43 rotates on the lower portion of the saddle-shaped cam surface 78. If the driver pulls rearwardly or upwardly on the stalk 22 the half-round finger surface 43 again has a linear element thereof wiping along a concave element of cam surface 78 to reciprocate the rod 28 and actuate the HI-LO beam switch 26.

It will be noted in FIG. 3 that center "C" of the radius of curvature of the concave medial element of surface 78 is intersected by the column transverse tilt axis 58. This is an important feature of the invention as it allows the pivoting finger surface 43 to track the concave surface 78 of the cam member 66 for any of the tilt column positions as indicated, for example, at 42' and 42".

While only one embodiment of this invention has been described those skilled in the art will appreciate that other embodiments may be possible without departing from the scope of the following claims.

What is claimed is:

1. In combination,
    a vehicle steering column having upper and lower steering shafts for rotation about a steering axis, universal joint means pivotally interconnecting said steering shafts so that said upper shaft can turn said lower shaft and be movable about a generally horizontal tilt axis to a plurality of angular positions with respect to said lower shaft, a steering wheel secured to the free end of said upper shaft for rotating said upper and lower shafts, a stationary tilt head support disposed around said lower shaft, a tilt head assembly disposed around said upper shaft and rotatably supporting said upper steering shaft,
    a turn signal switch having a stationary portion affixed to said tilt head assembly,
    a movable contactor portion pivotally mounted on and relative to said stationary portion about a first axis extending longitudinally of the steering column,
    a headlamp beam dimmer switch having a downwardly depressible spring-biased plunger thereon, said dimmer switch mounted on said steering column in a location longitudinally displaced from said turn signal switch,
    an actuation rod mounted for reciprocation on and extending longitudinally of said steering column having first and second ends, said rod first end in engagement with said dimmer switch plunger for depressible actuation thereof upon longitudinal reciprocation of said rod,
    a control lever extending transversely of the longitudinal axis of said steering column and swingably movable in a first plane transverse to said steering axis of said steering column and in a second plane intersecting and mutually orthogonally related to said first plane,
    a motion translating assembly enabling selective actuation of said turn signal switch independently of said dimmer switch upon swingable movement of said control lever in said first plane and selective actuation of said dimmer switch plunger independently of said turn signal switch upon swingable movement of said lever in said second plane,
    said motion translating assembly having a first member drivingly coupled to one end of said movable contactor portion of said turn signal switch for rocking said movable turn signal contactor portion about said first axis upon swingable movement of said control lever in said first plane and,
    a second member affixed to said control lever and pivotally coupled to the other end of said first member of said motion translating assembly for movement relative thereto on a second axis spaced from and normal to said first axis upon swingable movement of said control lever in said second plane, said second member of said motion translating assembly having an arm portion thereon extending inwardly toward said steering column, the improvement wherein:
    said tilt head axis being oriented so as to intersect said second axis in an orthogonal manner,
    said arm portion terminating in a camming finger formed with a rounded surface, said finger extending in a transverse direction substantially parallel to said tilt axis,
    a dimmer switch plunger actuating cam member pivotally mounted on said tilt head support for pivotal movement about a cam axis disposed in an orthogonal offset manner to said first axis,
    said cam member having first and second oppositely facing surfaces, said first surface formed with a compound-curved shaped camming surface and said second surface formed with a pocket capturing the other end of said rod, said rod having its longitudinal axis aligned in axial registration with said first axis corresponding to the pivot axis of the movable portion of said turn signal switch,
    said compound-curved first surface defining a plurality of normally oriented convex curved and concave curved line elements, said compound curved first surface having each of its convex curved line elements lying in a plane intersecting said cam pivot axis at a right-angle and each of its concave curved line elements lying in a plane intersecting said tilt axis at a right angle, whereby upon said tilt head being pivoted about said tilt axis throughout a predetermined arc said finger rounded surface maintains operative sliding contact with one of said concave curved line elements such that upon swingable movement of said control lever in said second plane said finger is moved toward said cam member causing said finger rounded surface to wipe along a convex curved line element of said first surface so as to pivot said cam member toward said dimmer switch resulting in longitudinal reciprocal movement of said rod and depressible actuation of said dimmer switch spring-biased plunger.

* * * * *